F. L. STUART.
APPARATUS FOR CONVEYING, DELIVERING, AND GATHERING MATERIAL.
APPLICATION FILED JUNE 27, 1919.
1,325,812.
Patented Dec. 23, 1919.
2 SHEETS—SHEET 1.
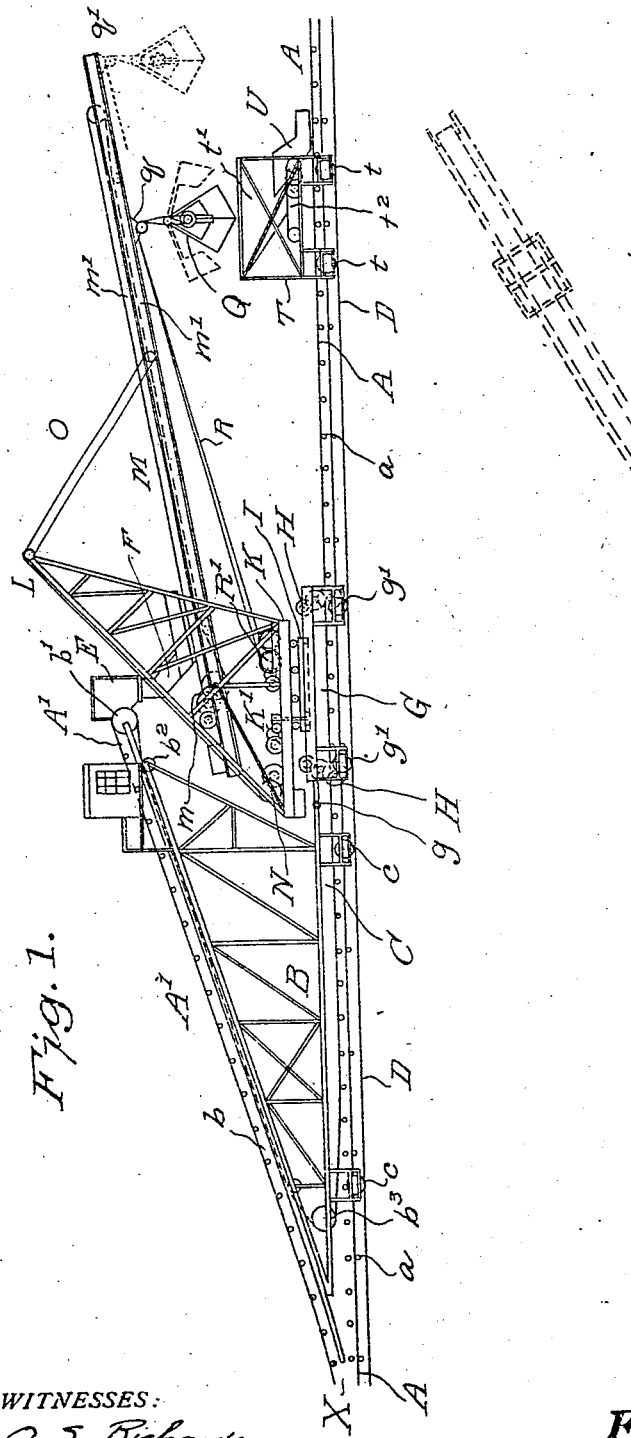
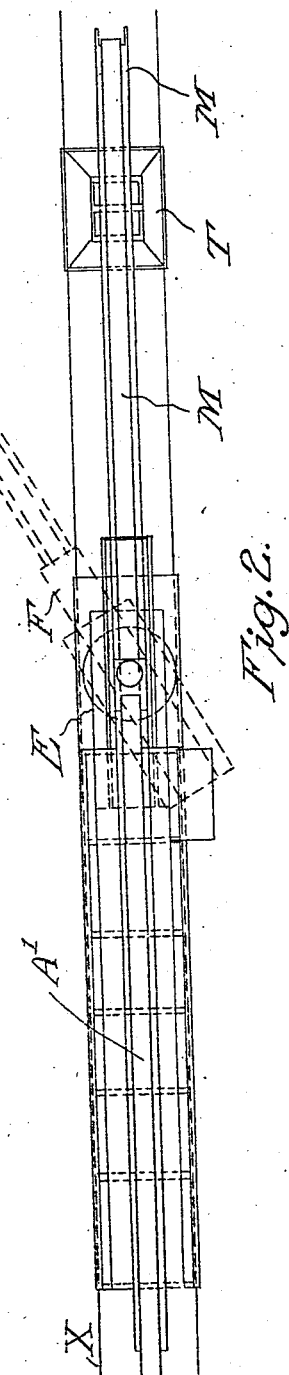
WITNESSES:
O. S. Richardson
F. C. Thomas
INVENTOR
Francis Lee Stuart.
BY HIS ATTORNEYS
Baldwin Wight

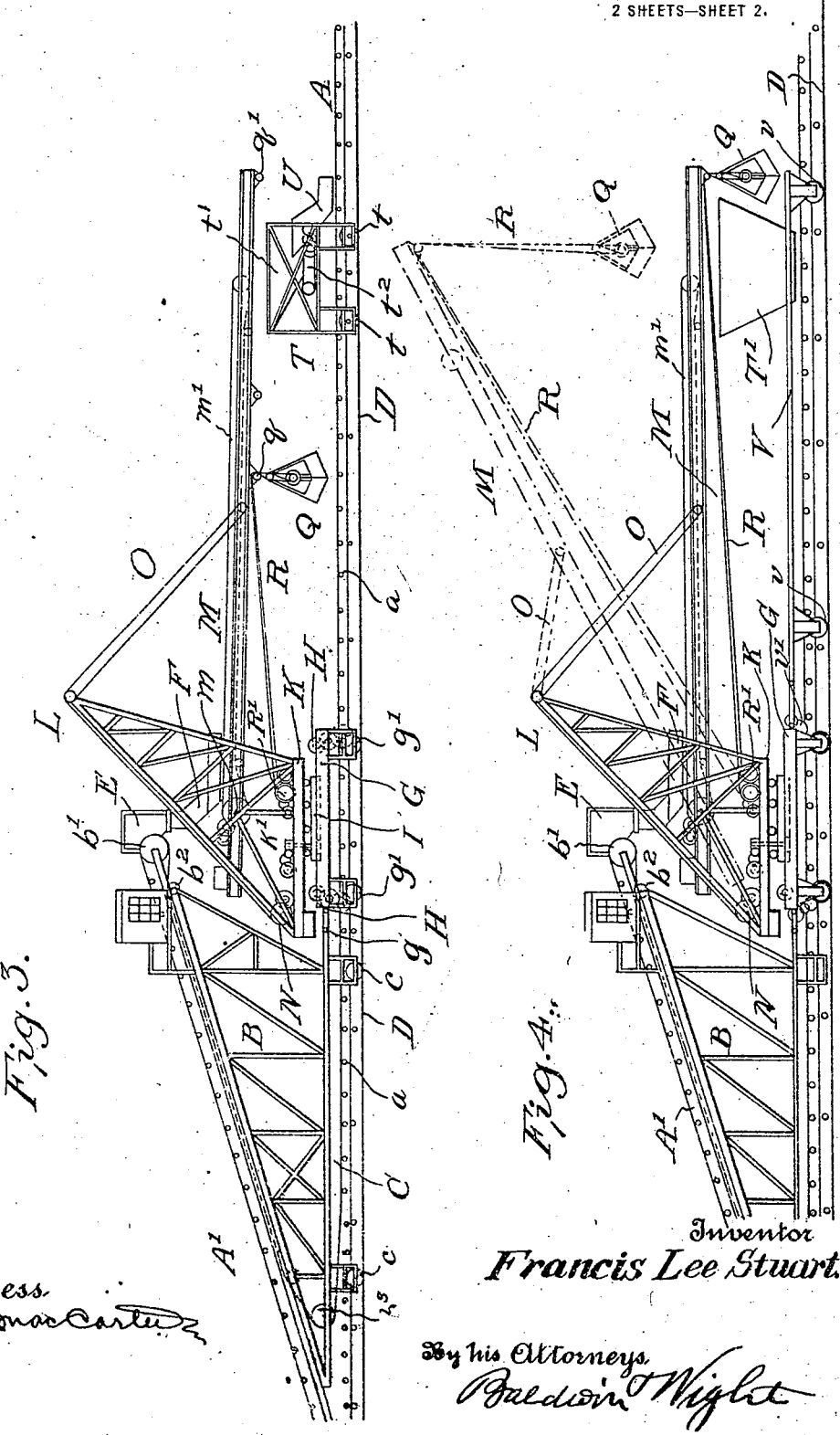

UNITED STATES PATENT OFFICE.

FRANCIS LEE STUART, OF NEW YORK, N. Y.

APPARATUS FOR CONVEYING, DELIVERING, AND GATHERING MATERIAL.

1,325,812.  Specification of Letters Patent.  Patented Dec. 23, 1919.

Application filed June 27, 1919. Serial No. 307,079.

*To all whom it may concern:*

Be it known that I, FRANCIS LEE STUART, a citizen of the United States, residing in New York city, in the county and State of New York, have invented certain new and useful Improvements in Apparatus for Conveying, Delivering, and Gathering Material, of which the following is a specification.

This invention relates to apparatus for carrying material, brought from a distance by a main conveyer belt, to a pile or place for storage or delivery, and also to apparatus for gathering material and depositing it on a conveyer which carries it to a distant point.

In my application for Patent No. 237,880, filed June 3, 1918, I have shown apparatus which is so constructed that it may be operated to either deliver material from a main conveyer belt to a place for storage, or may gather material from a pile or source of supply and deliver it to said main conveyer belt. In such apparatus a tripper delivers to a conveyer belt carried by a boom mounted to turn about both vertical and horizontal axes. The boom is provided with means for transferring material from the tripper to the boom conveyer, and it is also provided with a plow which gathers material and transfers it to the boom conveyer which in turn delivers the material to the main conveyer belt. In said apparatus means is provided for operating the boom conveyer in opposite directions, i. e., in a direction to deliver material from its outer end or to receive material at its outer end and convey it inward and deliver it to the main conveyer belt.

According to my present invention instead of employing a plow on the outer end of the boom conveyer and instead of operating the boom in opposite directions, I employ a grab bucket for gathering material and so mount it on the boom that without interference with said boom conveyer it may gather material from storage and deliver it through a suitable hopper to a main conveyer belt without employing the boom conveyer for this purpose. In this way the apparatus is adapted for use where a grab bucket is more suitable for gathering material than a plow.

My improvements are illustrated in the accompanying drawings in which:—

Figure 1 shows a side elevation of the new apparatus.

Fig. 2 is a plan view thereof.

Fig. 3 is a view similar to Fig. 1 but showing the apparatus adjusted to deliver material from the boom conveyer to a hopper which transfers it to the main conveyer belt.

Fig. 4 is a view similar to Figs. 1 and 3, but illustrating a modified construction in which, instead of employing a movable hopper of the kind shown in Figs. 1, 2 and 3, a stationary hopper is employed, i. e., a hopper which is carried by the truck which supports the tripper and the boom conveyer.

A main conveyer belt A, as usual, is supported on rollers $a$, and may be of any desired length so as to convey material from a distant source of supply. It is provided with a looped portion or tripper A' supported on a frame B, mounted on a truck C, the wheels $c$ of which traverse a track D running parallel with the main conveyer belt. Said belt enters the apparatus at X, traverses the inclined portion $b$ of the frame, passes over a delivery roller $b'$, thence over bend rollers $b^2$, $b^3$, and thence horizontally under the truck in the usual way. The delivery roller discharges into a hopper E which is supported on and projects from the frame B of the tripper. The hopper E delivers to another hopper F, supported by the frame of the delivery apparatus.

The truck G of the delivery apparatus is connected at $g$ to the truck C and its wheels $g'$ traverse the track D. Motor mechanism H on the truck drives the wheels $g'$ and the truck supports a circular platform I on which is mounted a turntable K. The turntable revolves about a vertical axis and may be operated by motor mechanism K'. The boom supporting frame L is anchored to the turntable and the boom M is pivotally connected at $m$ to the boom supporting frame so as to be able to turn about a horizontal axis. The boom M carries an endless conveyer belt $m'$ of the usual kind.

For the purpose of raising and lowering the boom conveyer in order that it may deliver at any desired elevation, I provide a motor operated drum N which is connected with the boom by cables O.

The apparatus thus far described is similar to that shown and claimed in my application for patent filed may 31, 1919, No. 300,973, and is suitable for use as a stacker or deliverer of material, but the same apparatus can be employed for gathering material and transferring it to the main conveyer belt if equipped with a grab bucket and suitable operating mechanism.

In Fig. 1, Q illustrates a grab bucket of well known construction which may be suspended from the boom at $q$ or it may be suspended at $q'$ or at any other suitable point along the boom. The grab bucket may be raised and lowered, and opened and closed by cables R extending to operating mechanism R' of any suitable kind. T indicates a hopper mounted on wheels $t$ traversing the track D. The hopper receives material at $t'$ and a belt $t^2$ delivers the material to a chute U, which in turn delivers it to the main conveyer belt A. The hopper T may be moved back and forth on the track to assume a suitable relation with the grab bucket. The boom conveyer may be raised and lowered in the manner before described and swung about its vertical axis to any desired extent on either side of the main conveyer belt and it may be operated to gather and raise material to a plane above the hopper T. The boom conveyer may then be moved to a position over said hopper, the grab bucket opened and material delivered.

In Fig. 3 I have shown the apparatus adjusted to deliver material from the boom conveyer to the hopper. While the apparatus when delivering ordinarily piles the material on either side of the main conveyer belt, it sometimes is desirable not to so deliver the material, but to pass it on to another point or to another apparatus which will deliver the material at some distant point. This may be done in the manner indicated in Fig. 3. The hopper T may at any time be so adjusted as to come under the outer end of the boom conveyer belt.

In Fig. 4, I have shown a modification in which the hopper, instead of being mounted on a truck movable independently of the truck which supports the boom conveyer, is mounted on a truck movable coincidently with the truck of the boom conveyer. This hopper T' is carried by a truck V mounted on wheels $v$ traversing the track D. The truck V is shown as being coupled at $v'$ to the truck G, but really forms a continuation of this truck. In Fig. 4 the boom conveyer is shown in full lines as being adjusted to deliver to the hopper T', the grab bucket at this time not being in operation, and it will be observed that the parts are so related with each other that they do not in any way interfere. The boom can be adjusted to either deliver material to storage or to deliver to the hopper as before explained. At this time the grab bucket will be drawn up out of operative position as indicated, or when it is desired to gather material from storage and transfer it to the main conveyer belt, the boom conveyer may be turned and raised and lowered in any desired way, and when delivering to the hopper T' it will, of course, be moved to a position over the hopper as indicated.

The stacker shown in the accompanying drawings and hereinbefore described, is not herein claimed specifically. Certain features of construction of said stacker are claimed in my application for Patent No. 300,973, filed May 31, 1919.

I claim as my invention:—

1. Apparatus for reclaiming and conveying material, comprising a main conveyer, a truck mounted to move parallel therewith, a boom conveyer supported at its inner end by the truck to turn about a vertical axis, means for delivering material from the main conveyer belt to the boom conveyer, a hopper for delivering material to the main conveyer, a grab bucket supported by the boom conveyer and delivering to said hopper, and means for operating the grab bucket.

2. Apparatus for conveying, delivering and gathering material, comprising a main conveyer belt provided with a tripper, a boom conveyer to which the tripper delivers, means for supporting the boom conveyer to turn about both vertical and horizontal axes, a grab bucket supported by the boom conveyer, means for operating it, and a hopper to which the grab bucket delivers and which transfers material thus delivered to the main conveyer belt.

3. Apparatus for conveying, delivering and gathering material, comprising a main conveyer belt provided with a tripper, a boom conveyer to which said tripper delivers and which in turn delivers to places of storage, a truck on which said boom conveyer is mounted to turn about both vertical and horizontal axes, a grab bucket supported by the boom conveyer, and a hopper beneath the boom conveyer which is adapted to receive material either from the grab bucket or from the boom conveyer.

4. Apparatus for conveying, delivering and gathering material, comprising a main conveyer belt, a track parallel therewith, a truck mounted on said track, a boom conveyer mounted on said truck to move about both vertical and horizontal axes and which receives material from the main conveyer belt and delivers it to storage, a grab bucket supported by the boom conveyer, means for operating the grab bucket, and a hopper adapted to receive material from either the boom conveyer or from the grab bucket and which is movably supported on said track.

In testimony whereof I have hereunto subscribed my name.

FRANCIS LEE STUART.